May 11, 1926.

J. T. SIBLEY 1,583,804

SELF STARTING MOTOR

Filed Sept. 19, 1923

J. T. Sibley.
INVENTOR.

By Louis M. Sanders
ATTORNEY.

Patented May 11, 1926.

1,583,804

UNITED STATES PATENT OFFICE.

JAMES T. SIBLEY, OF NEW YORK, N. Y.

SELF-STARTING MOTOR.

Application filed September 19, 1923. Serial No. 663,577.

My invention relates to an improved form of electric motor for use in connection with talking machines, and is characterized by the employment of a pair of field magnets between the poles of which the armature poles of a disk rotor is made to swing, each of the magnets being connected up to a separate source of electrical supply; it has to do more particularly with the improved means for alternately closing and breaking the circuit leading to the magnets, whereby they are alternately energized to give the rotor a rapid succession of electromagnetic impulses and thereby maintain a uniform rate of rotation. Means are also provided whereby the motor is self-starting, no matter what position the poles of the rotor may occupy with respect to the poles of the magnets.

In the drawing.

Similar reference numerals refer to like parts throughout the specification and drawing.

Figure 1:
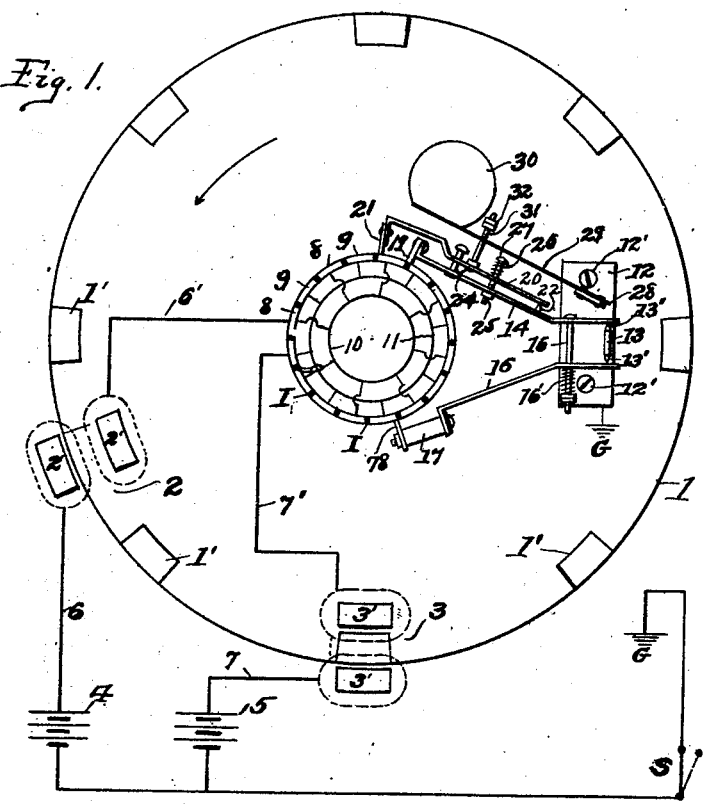
Fig. 1 is a bottom plan view of the rotor, showing the relative location of the field magnets and also diagrammatically showing the circuits.
Figure 2:
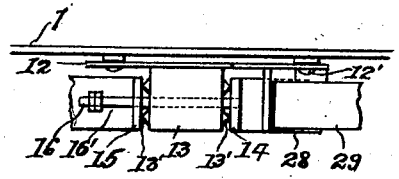
Fig. 2 is an elevation of the interrupter mounting.

The rotor 1 is of disk shape having a plurality of armature projections or poles 1' spaced about and depending from the periphery. The magnets 2, 3 have their poles 2', 3' located on either side of the poles 1' leaving a comparatively small air gap, and so spaced apart that as one of the poles 1' is axially aligned with the poles of one magnet, the poles of the other magnet will be midway between two other poles 1'. The two sets of batteries 4, 5 are connected in parallel with the magnets 2, 3, and the wires 6', 7' lead from magnets 2, 3 to the connections 10, 11, which are respectively connected to alternate segments 8 and 9 of the stationary element of the circuit interrupter. Upon the under face of the rotor 1 is a bracket plate 12 secured in place by the screws 12'. Projecting downwardly from the bracket plate is a bracket 13, provided upon each of its lateral edges with two cusps or points 13'. Bearing upon these cusps 13' are the two interrupter arms 14, 15, extending forwardly and connected together by the screw bolt 16, which passes through the arms and is provided with a spring 16' bearing upon the outer side of the arm 15. The outer end of the arm 15 has connected to it a resistance 17, which may be a wire resistance or a carbon resistance, the latter being shown. Beyond the resistance is the resistance brush 18, in position to bear upon the stationary interrupter segments 8, 9. The arm 14 also extends forwardly, and has at its free end the working brush 19 in position to bear upon the opposite side of the stationary interrupter segments 8, 9. The relative positions of the two brushes 18 and 19 are such that as the brush 19 is just leaving one of the segments, as 9, the brush 18 will be in lagging contact with a corresponding segment 9 upon the other side; as the brushes advance around the segments 8, 9, the brush 19 will always be in position to break contact with a segment at the same instant that the other brush 18 is about to leave a corresponding segment upon the opposite side.

The adjacent segments 8 and 9 are separated by insulation I. The resistance 17 is high enough to prevent a sufficient amount of current to pass through the arm 15 and its connections to energize the magnets 2, 3, its sole purpose being to prevent sparking and the consequent pitting of the interrupter segments. With the structure as thus far described alone, if the rotor should stop with the brush 19 upon one of the insulation segments I, when the switch S is again closed, the motor would not start of itself, and the only way to start it would be to give the rotor a slight impulse by hand in the direction of the arrow, after which the circuit would be completed alternately and intermittently through the magnets 2, 3, and thus the rotor would receive a succession of impulses of sufficient strength to maintain a continuous rotation. It is to overcome this particular defect and obviate the necessity of giving the rotor an initial impulse in order to start its rotation that the present improvement was designed.

Upon the outer side of the arm 14, I mount a supplemental arm 20, which carries at its forward end a starter brush 21, the other end of the arm being pivoted upon a fulcrum point 22. Near the forward end of the arm 14 is a headed screw 24 passing both the arms 14 and 20, leaving a sufficient amount of lost motion to permit the lifting of the brush 21 from contact with the interrupter without disturbing the contact of the brush 19 therewith. In order, however to maintain contact of the brush 21 with the interrupter segments 8 and 9, I provide an additional spring bolt 25, passing through both of the arms 14 and 20, and having the spring 26 beneath its nut 27 bearing upon the outer side of the arm 20. Thus, the spring 16' maintains the two brushes 18, 19 in contact with the periphery of the interrupter, while the bolt 25 and spring 26 maintain the brush 21 in contact with the interrupter. The brushes 19 and 21 are so spaced apart that when the brush 19 is on the insulation I, the brush 21 will still be bearing upon a metallic segment, so that no matter where the rotor may stop, one of the brushes 19 or 21 will be on a metallic segment of the interrupter, and upon closing the switch S, the circuit will be closed through one or the other of the batteries 4 or 5 and the corresponding magnet 2 or 3.

After the motor is started, it is desirable that only the brush 19 should remain upon the interrupter. In order to lift the starter brush from the interrupter, I provide the plate 12 with a downward projection 28, upon the outer side of which is secured the long flat spring 29, having at its free end the weight 30. The spring 29 is connected to the arm 20 by a small bolt 31, with an adjusting nut 32, in position to receive the thrust of the spring 29 as it flies away from the center of rotation, when the rotor begins to swing around in the direction of the arrow. Only a slight rotation of the rotor will be sufficient to cause the weight 30 to lift the brush 21 from the periphery of the interrupter segments 8, 9, after which the rotor will have sufficient momentum to carry the brush across the insulation I, and make successive contact with the segments 8 and 9.

From an inspection of Fig. 1, it will be noted that the brush 19 has advanced upon insulation, thereby breaking the circuit through the magnet 3, and that the pole 1' is axially aligned with the magnet poles 3'. (It is assumed that the starter brush has been lifted from the interrupter by the rotation of the rotor). This is as it should be, for at the instant the poles 1' pass the magnet poles 2' or 3' the magnetic pull should be broken upon that particular armature pole. As the rotor advances, the brush 19 will also advance into contact with the next interrupter segment as 8, when the magnet 2 will be energized, and will exert a pull upon the advancing pole 1'. In this manner the rotor 1 receives its succession of impulses sufficient to maintain its motion; if, however, the power supplied by the two battery sets 4, 5 increases the speed of the rotor beyond that which is requisite, the weight 30 will swing outwardly, and through the connecting bolts 31 and 24, will lift the brush 19 clear of the interrupter segments 8, 9, and thereby break the circuit and cut off the motive power. The adjustment of the nut 32 upon the bolt 31 can be so regulated as to attain the proper speed within limits.

It will be noted that the two battery sets 4, 5 are alternately in circuit, thereby taking advantage of the usual power of such dry cells to recuperate when run as open circuit cells.

It will thus be seen that no matter in what position the rotor 1 may stop, one or the other of the two brushes 19, 21 will be in position to close the circuit through the corresponding battery set whenever the switch S is closed, and that when rotation begins, centrifugal action will lift the brush free from the interrupter and thereafter said brush will be ineffective.

I claim:—

1. In a starter for electric motors, the combination of a rotor having a plurality of armature poles and a field magnet having its poles located in proximity to the path of said armature poles, a stationary circuit interrupter having a series of metallic segments upon its surface, a brush mounted upon said rotor to rotate therewith in contact with said interrupter, a supplemental brush connected to and in advance of said first named brush, and means for separating said supplemental brush from said interrupter after said rotor begins to rotate.

2. In a starter for electric motors, the combination of a rotor and a stator, a cylindrical interrupter having a series of metallic segments upon the surface thereof, a main brush mounted upon said rotor for yielding contact with said interrupter, a supplemental brush connected to said main brush for contact with a segment of said interrupter in advance of said main brush, and means for separating said supplemental brush from said interrupter after said rotor has acquired a predetermined rate of rotation.

3. In a starter for electric motors, the combination of a rotor, a stator and a segmental circuit interrupter, a main brush carried by said rotor for yielding contact with said interrupter, a supplemental brush connected to said main brush for contact with a segment of said interrupter in advance of said main brush, and a centrifugal weight connected to said supplemental brush for separating it from said interrupter when said rotor shall have attained a predetermined speed.

4. In a starter for electric motors, the combination of a rotor, a stator and a stationary segmental circuit interrupter, with a main brush and a resistance brush yieldingly connected together and mounted upon said rotor in position to bear at substantially diametrical points upon the surface of said interrupter, a supplemental brush connected to said main brush for contact with a segment of said interrupter in advance of said main brush, and means governed by the rotation of said rotor for separating said supplemental brush from said interrupter at a predetermined low rate of rotation.

5. In a starter for electric motors, the combination of a rotor, a stator, and a segmental circuit interrupter, with a main brush and a resistance brush yieldingly connected together and mounted upon said rotor in position to bear at substantially diametrical points upon the surface of said interrupter, a supplemental brush connected to said main brush for contact with a segment of said interrupter in advance of said main brush, and means for separating said supplemental brush from said interrupter at a predetermined low rate of rotation, and for separating said main brush from said interrupter at a predetermined high rate of rotation.

6. In a starter for electric motors, the combination of a rotor, a stator and a segmental circuit interrupter, with a main brush and a supplemental brush each mounted upon said rotor for yielding contact with different segments of said interrupter, and centrifugal means carried by said rotor for successively separating said brushes from said interrupter at different predetermined rates of rotation of said rotor.

7. In a starter for electric motors, the combination of a rotor, a stator and a stationary segmental circuit interrupter, a pair of brushes carried by said rotor for yielding contact with different segments of said interrupter, and a centrifugal weight carried by said rotor and adapted to successively separate said brushes from said interrupter, the one at a low rate and the other at a higher rate of rotation of said rotor.

8. In a starter for electric motors, the combination of a rotor, a stator and a stationary segmental circuit interrupter, a main brush and a supplemental brush mounted upon said rotor to contact with the segments of said interrupter and so spaced apart that one of said brushes will begin contact with a segment at the same time that the other brush is breaking contact with a segment, and centrifugal means mounted upon said rotor for successively separating said brushes from said interrupter at differing predetermined rates of rotation of said rotor.

9. In a starter for electric motors, the combination of a rotor, a stationary segmental circuit interrupter and a pair of brushes mounted for substantially diametrical contact with said interrupter, means for supporting said brushes, comprising a pair of arms yieldingly connected together, and a bracket mounted upon said rotor and provided upon its opposite parallel edges with cusps or points, against which said arms respectively bear.

10. In a starter for electric motors, the combination of a bracket having parallel edges, cusps or points upon said edges, a brush upon the free end of each of said arms, a circuit interrupter located between said brushes, and a spring bolt connecting said arms for holding the same in contact with said cusps or points and said brushes in yielding rubbing contact with said interrupter.

JAMES T. SIBLEY.